US012606738B2

(12) United States Patent
Kitagawa et al.

(10) Patent No.: US 12,606,738 B2
(45) Date of Patent: Apr. 21, 2026

(54) RARE EARTH COMPLEX

(71) Applicant: NATIONAL UNIVERSITY CORPORATION HOKKAIDO UNIVERSITY, Sapporo (JP)

(72) Inventors: Yuichi Kitagawa, Sapporo (JP); Ayu Naito, Sapporo (JP); Yasuchika Hasegawa, Sapporo (JP); Koji Fushimi, Sapporo (JP)

(73) Assignee: NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 789 days.

(21) Appl. No.: 17/788,530

(22) PCT Filed: Dec. 23, 2020

(86) PCT No.: PCT/JP2020/048239

§ 371 (c)(1), (2) Date: Jun. 23, 2022

(87) PCT Pub. No.: WO2021/132373

PCT Pub. Date: Jul. 1, 2021

(65) Prior Publication Data

US 2023/0089029 A1 Mar. 23, 2023

(30) Foreign Application Priority Data

Dec. 25, 2019 (JP) ................................ 2019-234712

(51) Int. Cl.

*C09K 11/06* (2006.01)
*C07F 9/53* (2006.01)

(52) U.S. Cl.

CPC ........... *C09K 11/06* (2013.01); *C07F 9/5345* (2013.01); *C09K 2211/1007* (2013.01); *C09K 2211/1011* (2013.01); *C09K 2211/1014* (2013.01); *C09K 2211/182* (2013.01)

(58) Field of Classification Search

CPC ............................ C07F 9/5345; C09K 11/06; C09K 2211/1011

See application file for complete search history.

(56) References Cited

U.S. PATENT DOCUMENTS

| | | | | |
|---|---|---|---|---|
| 10,745,614 | B2 * | 8/2020 | Nakanishi | C08G 79/04 |
| 11,499,093 | B2 * | 11/2022 | Kitagawa | C09K 11/06 |
| 2014/0155562 | A1 * | 6/2014 | Thomas | C08F 36/08 526/170 |
| 2021/0130378 | A1 * | 5/2021 | Hasegawa | C09K 11/06 |
| 2022/0089942 | A1 * | 3/2022 | Kitagawa | C09K 11/06 |
| 2022/0315613 | A1 * | 10/2022 | Kitagawa | C07F 9/53 |

FOREIGN PATENT DOCUMENTS

| | | | | |
|---|---|---|---|---|
| CN | 102807592 | A * | 12/2012 | |
| JP | 2007210945 | A * | 8/2007 | H01L 51/0089 |
| JP | 2007-269780 | A | 10/2007 | |
| JP | 2016-166139 | A | 9/2016 | |
| JP | 2017-523124 | A | 8/2017 | |
| WO | 2015/169935 | A1 | 11/2015 | |
| WO | 2018/155557 | A1 | 8/2018 | |

OTHER PUBLICATIONS

CAS Abstract and Indexed Compounds, H. Tabata, JP 2007210945 (2007) (Year: 2007).*
CAS Abstract and Indexed Compounds H. Xu et al., 47 Dalton Transactions, 6908-6916 (2018) (Year: 2018).*
J. March, Advanced Organic Chemistry Reactions, Mechanisms and Structure 37-64, 49 (3rd ed., 1985) (Year: 1985).*
J. Bridges et al., Fluorescence of solutions: A review, 17 Journal of clinical pathology, 371-394 (1964) (Year: 1964).*
R. Schoetal et al., Fluorescence Spectra of Polycyclic Aromatic Hydrocarbons in Solution, Journal of the Chemical Society (Resumed), 1683-1696 (1949) (Year: 1949).*
H. Xu et al., 47 Dalton Transactions,6908-6916 (2018) (Year: 2018).*
S. Pope, 26 Polyhedron, 4818-4824 (2007) (Year: 2007).*
J. Kang et al., 40 New Journal of Chemistry, 9702-9710 (2016) (Year: 2016).*
International Search Report issued Feb. 9, 2021 in International Application No. PCT/JP2020/048239.
International Preliminary Report on Patentability issued Jun. 30, 2022 in International Application No. PCT/JP2020/048239.
Xu et al., "Regulating structural dimensionality and emission colors by organic conjugation between $Sm^{III}$ at a fixed distance", Dalton Transactions, 2018, vol. 47, No. 20, pp. 6908-6916 (9 pages total).
Krekic, et al.,"Structural and Luminescence Properties of Anthracene- and Biphenyl-Based Lanthanide Bisphosphonate Ester Coordination Polymers", Inorganic Chemistry, 2019, vol. 58, pp. 382-390 (9 pages).
Firmino, et al.,"Pyrene Teraphosphonate-Based Metal-Organic Framework: Structure and Photoluminescence", European Journal Inorganic Chemistry, 2020, pp. 3565-3572 (9 pages).
"31st Photochemistry Conference on Coordination Compounds", 2019, pp. 52-53 (7 Pages).

(Continued)

*Primary Examiner* — Alexander R Pagano
(74) *Attorney, Agent, or Firm* — Sughrue Mion, PLLC

(57) ABSTRACT

Disclosed is a rare earth complex including: one or a plurality of rare earth ions; and a ligand forming a coordinate bond with the rare earth ions. At least a part of the rare earth ions are at least one kind selected from the group consisting of lutetium(III) ions, yttrium(III) ions, and gadolinium(III) ions. The ligand includes a residue obtained by removing one or more hydrogen atoms from a fluorescent condensed polycyclic aromatic compound.

4 Claims, 6 Drawing Sheets

(56) References Cited

OTHER PUBLICATIONS

Japanese Notice of Reasons for Refusal dated Sep. 3, 2024 in Japanese Application No. 2021-567564.
Naito, et al., "Photophysical properties of organic-aggregates composed of perylene frameworks in lanthanide complex", The Chemical Society of Japan, 2019, pp. 1-3 (3 pages).

* cited by examiner

RARE EARTH COMPLEX

CROSS REFERENCE TO RELATED APPLICATIONS

This application is a National Stage of International Application No. PCT/JP2020/048239 filed Dec. 23, 2020, claiming priority based on Japanese Patent Application No. 2019-234712 filed Dec. 25, 2019.

TECHNICAL FIELD

The present invention relates to a luminescent rare earth complex.

BACKGROUND ART

An organic fluorescent dye having a condensed polycyclic aromatic ring such as perylene has been known (for example, Patent Literature 1). The organic dye can provide not only a high emission quantum yield but also various functions, and from these aspects, the organic dye is expected to be applied to various fields as an organic light-emitting material.

CITATION LIST

Patent Literature

Patent Literature 1: Japanese Unexamined Patent Publication No. 2017-523124

SUMMARY OF INVENTION

Technical Problem

An aspect of the present invention provides an organic light-emitting material having high heat resistance.

Solution to Problem

An aspect of the present invention relates to a rare earth complex (rare earth compound) comprising: one or a plurality of rare earth ions; and a ligand forming a coordinate bond with the rare earth ions. At least a part of the rare earth ions are at least one kind selected from the group consisting of lutetium(III) ions, yttrium(III) ions, and gadolinium(III) ions. The ligand comprises a residue obtained by removing one or more hydrogen atoms from a fluorescent condensed polycyclic aromatic compound.

There is a tendency that the rare earth complex having a lutetium(III) ion, a yttrium(III) ion, and a gadolinium(III) ion is generally difficult to exhibit intensive fluorescence emitting property. However, according to the finding of the present inventors, a rare earth complex emitting intensive fluorescent light while having high heat resistance can be formed by combining these rare earth ions and a ligand having a fluorescent condensed polycyclic aromatic group.

Advantageous Effects of Invention

According to an aspect of the present invention, there is provided an organic light-emitting material having high heat resistance. The rare earth complex according to an aspect of the present invention can emit intensive light even in a solid or a high-concentration solution. The rare earth complex according to an aspect of the present invention can emit intensive blue light. The rare earth complex according to an aspect of the present invention can exhibit luminescence properties varying depending on temperatures.

DESCRIPTION OF EMBODIMENTS

Figure 1:
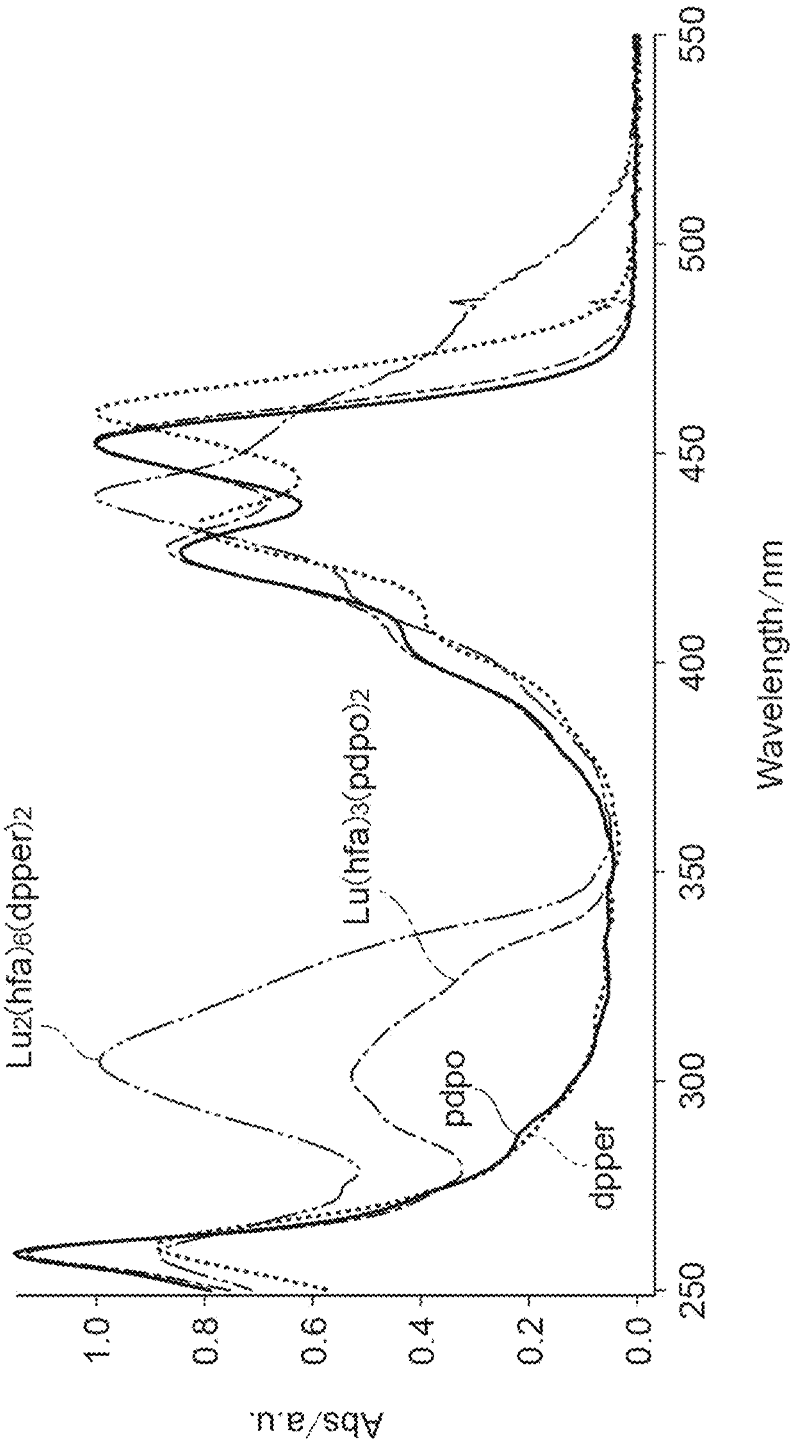
FIG. 1 shows photoabsorption spectra of a ligand and a lutetium complex.

Hereinafter, some embodiments of the present invention will be described in detail. However, the present invention is not limited to the following embodiments.

A rare earth complex according to an embodiment has one or a plurality of rare earth ions and a ligand coordinated with the rare earth ions. At least a part of the rare earth ions are at least one kind selected from the group consisting of lutetium (Lu)(III) ions, yttrium (Y)(III) ions, and gadolinium (Gd)(III) ions. The rare earth complex may have one or more Lu(III). The rare earth complex may have at least one kind of rare earth ion selected from the group consisting of a lutetium (Lu)(III) ion, a yttrium (Y)(III) ion, and a gadolinium (Gd)(III) ion, and a trivalent rare earth ion other than these ions. The trivalent rare earth ion may be, for example, a europium (Eu), neodymium (Nd), ytterbium (Yb), or terbium (Tb) ion.

The ligand includes a residue obtained by removing one or more hydrogen atoms from a fluorescent condensed polycyclic aromatic compound. For example, when the condensed polycyclic aromatic compound is a blue light-emitting compound, the rare earth complex can emit intensive blue light. The ligand may be a compound having a residue of the condensed polycyclic aromatic compound and a coordinating group forming a coordinate bond with the rare earth ion. The coordinating group may be bonded directly to a condensed polycyclic aromatic group derived from the condensed polycyclic aromatic compound.

Examples of the fluorescent condensed polycyclic aromatic compound include a compound represented by the following formula (1), (2), or (3):

(1)

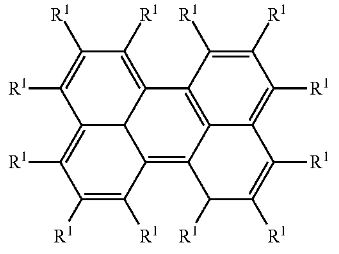

-continued (2)

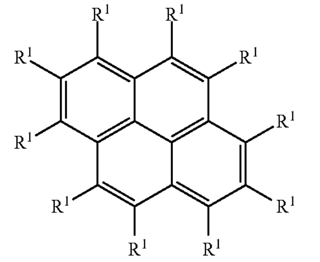

(3)

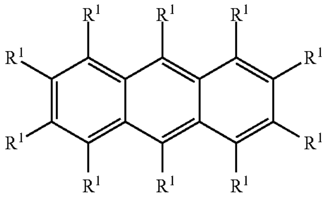

In these Formulae, $R^1$ represents a hydrogen atom, a halogen atom, a cyano group, an amino group which may have a substituent, or an aryl group which may have a substituent (for example, a phenyl group). A plurality of $R^1$s in the same molecule may be the same as or different from each other. $R^1$ may be a hydrogen atom. Some of the plurality of $R^1$s may be an aryl group which may have a substituent, and the remaining $R^1$s may be a hydrogen atom. A substituent which the amino group or the aryl group has may be, for example, a halogen atom.

For example, the residue derived from the condensed polycyclic aromatic compound of formula (1) may be a monovalent group represented by formula (1-1) below, a divalent group represented by formula (1-2) below, or a divalent group represented by formula (1-3) below. In formulae (1-1), (1-2), and (1-3), * represents a bond. The coordinating group may be bonded to the position of *.

(1-1)

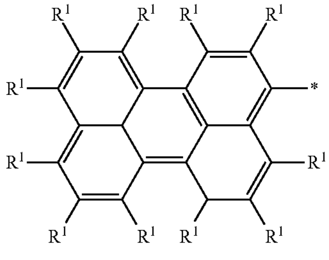

(1-2)

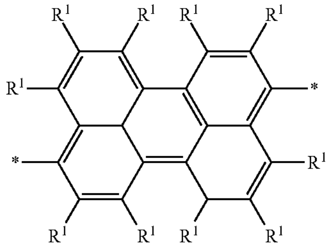

-continued (1-3)

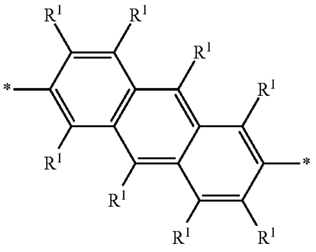

An example of the coordinating group is a phosphine oxide group. Specific examples of the ligand having a phosphine oxide group include a monodentate phosphine oxide ligand represented by formula (10) below and a bidentate phosphine oxide ligand represented by formula (11) below.

(10)

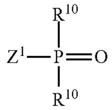

(11)

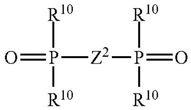

In formulae (10) and (11), $Z^1$ represents a monovalent residue derived from the condensed polycyclic aromatic compound, and $Z^2$ represents a divalent residue derived from the condensed polycyclic aromatic compound. In a case where the ligand is the bidentate phosphine oxide ligand represented by formula (11), the rare earth complex may include two rare earth ions. Each of two phosphine oxide groups of the phosphine oxide ligand of formula (11) may form a coordinate bond with one rare earth ion.

$R^{10}$ represents an aryl group which may have a substituent. A plurality of $R^{10}$s in one molecule may be the same as or different from each other. The aryl group for $R^{10}$ can be a residue obtained by removing one hydrogen atom from the aromatic compound. Generally, $R^{10}$ is an aryl group different from the condensed polycyclic aromatic group in $Z^1$ and $Z^2$. The number of carbon atoms of the aryl group is, for example, 6 to 14. Specific examples of the aryl group include a residue obtained by removing one hydrogen atom from substituted or unsubstituted benzene, substituted or unsubstituted naphthalene, substituted or unsubstituted anthracene, or substituted or unsubstituted phenanthrene. Particularly, $R^{10}$ may be a substituted or unsubstituted phenyl group. A substituent which the aryl group has may be a halogen atom.

Examples of the monodentate phosphine oxide ligand represented by formula (10) include a phosphine oxide compound represented by formula (20) below. Examples of the bidentate phosphine oxide ligand represented by formula (11) include a phosphine oxide compound represented by formula (21) or (22) below. $R^1$ and $R^{10}$ in formulae (20), (21), and (22) each have the same meaning as $R^1$ in formula (1) and $R^{10}$ in formulae (10) and (11).

(20)

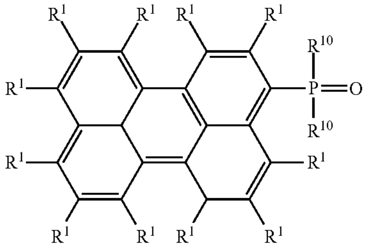

(21)

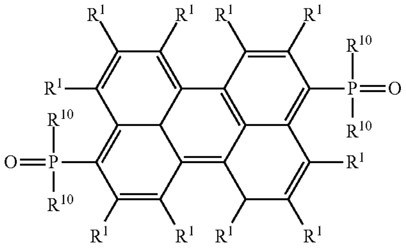

(22)

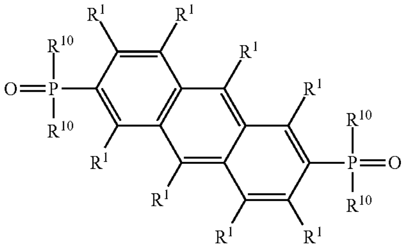

The rare earth complex according to an embodiment may further have a ligand other than the ligand having the residue derived from the condensed polycyclic aromatic compound. For example, the rare earth complex may further have a diketone ligand represented by formula (30) below. The rare earth complex including the diketone ligand represented by formula (30) may have further more excellent properties from the viewpoint of enhanced emission or the like.

(30)

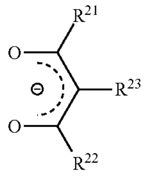

In formula (30), $R^{21}$, $R^{22}$, and $R^{23}$ each independently represent a hydrogen atom, an alkyl group, an alkyl halide group, an aryl group, or a heteroaryl group. The aryl group described herein may be an aryl group different from a condensed polycyclic aromatic group derived from the fluorescent condensed polycyclic aromatic compound.

The rare earth complex having the diketone ligand of formula (30) is represented, for example, by formula (I) or (II) below.

(I)

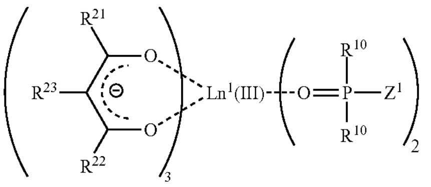

(II)

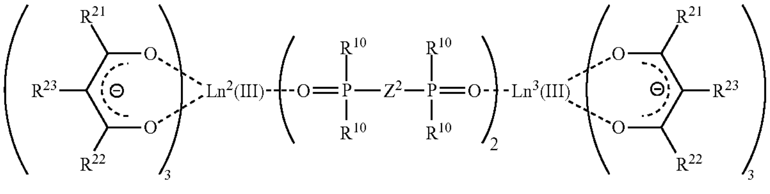

Ln[1](III) in formula (I) represents a Lu(III) ion, a Y(III) ion, or a Gd(III) ion. In formula (II), Ln[2](III) represents a Lu(III) ion, a Y(III) ion, or a Gd(III) ion, and Ln[3](III) represents a Lu(III) ion, a Y(III) ion, or a Gd(III) ion, or a trivalent rare earth ion other than these ions. Other symbols in formulae (I) and (II) have the same meaning as described above.

The rare earth complex may be a compound that has a plurality of rare earth ions and a plurality of bidentate ligands derived from a fluorescent condensed polycyclic aromatic compound and has a repeating structure formed by alternately arranging the rare earth ions and the bidentate ligands. The rare earth complex having the repeating structure is represented, for example, by formula (III) below.

(III)

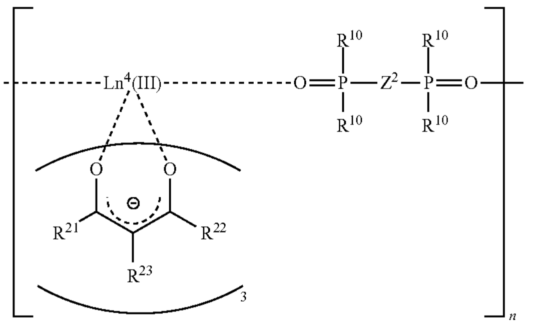

$Ln^4$ in formula (III) represents a Lu(III) ion, a Y(III) ion, or a Gd(III) ion. n represents the number of repetitions. Other symbols have the same meaning as described above.

The rare earth complex according to the embodiment described above can be produced according to an ordinary synthesis method. Examples of the synthesis method will be shown in Examples described below.

A luminescent body including the rare earth complex according to the present embodiment can show high-luminance light emission such as blue light emission.

EXAMPLES

Hereinafter, the present invention will be described in more detail by means of Examples. However, the present invention is not limited to these Examples.

1. Synthesis of Ligand

Synthesis Example 1: Monodentate Ligand pdpo (3-Perylene Diphenylphosphine Oxide)

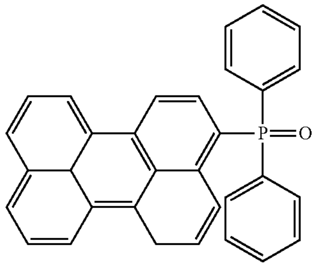

pdpo

Synthesis of 3-Bromoperylene

N-bromosuccinimide (NBS, 564 mg, 3.2 mmol) was dissolved in super dehydrated tetrahydrofuran (THF, 40 ml) to obtain an NBS solution. Perylene (800 mg, 3.2 mmol) was added to super dehydrated THF (50 ml) and dispersed. The NBS solution (40 ml) was added dropwise to the obtained dispersion liquid, and the dispersion liquid was refluxed for 24 hours at 50° C. to react perylene with NBS. After completing the reaction, powder was obtained by reprecipitation from a mixed solvent of THF and $H_2O$. The obtained powder was washed with hexane and dried to obtain a solid of the product (3-bromoperylene) (yield constant 40%, yield 425 mg).

$^1H$ NMR (400 MHz, $CDCl_3$/TMS) δ/ppm=7.48 (t, 2H), 7.58 (t, 1H), 7.70 (d, 2H), 7.76 (d, 1H), 8.00 (d, 1H), 8.08 (d, 1H), 8.16 (d, 1H), 8.20 (d, 1H), 8.23 (d, 1H)

Synthesis of pdpo

3-Bromoperylene (2.0 g, 6.1 mmol), potassium acetate (710 mg, 7.3 mmol), and palladium(II) acetate (13.5 mg, 0.06 mmol) were dissolved in super dehydrated dimethyl acetamide (100 ml, 100° C.) to prepare a reaction solution. Diphenylphosphine (1.2 ml, 6.1 mmol) was added dropwise to this reaction solution, and the reaction solution was refluxed for 24 hours at 100° C. Subsequently, the reaction solution was added to $H_2O$ (400 ml), and the produced precipitate was extracted with dichloromethane and saturated saline. The solvent was distilled from the dichloromethane layer by an evaporator. The residual solid was dissolved in chloroform (80 ml), a 30% hydrogen peroxide solution (15 ml) was added to the solution, and the solution was stirred at 0° C. for 3 hours. Thereafter, the product was extracted from the solution with chloroform and saturated saline. The solvent was distilled from the chloroform layer, and the residue was purified by column chromatography (mobile phase: ethyl acetate) to obtain a solid of the product (pdpo) (yield constant 10%, yield 292 mg).

$^1H$ NMR (400 MHz, $CDCl_3$) δ/ppm=7.40-7.59 (m, 9H), 7.71-7.79 (m, 7H), 8.07 (dd, 1H), 8.22 (t, 3H), 8.48 (d, 1H)

ESI-MS: m/z calcd for $C_{32}H_{22}O$ P $[M+H^+]$=453.13; found: 453.14.

Synthesis Example 2: Bidentate Ligand dpper

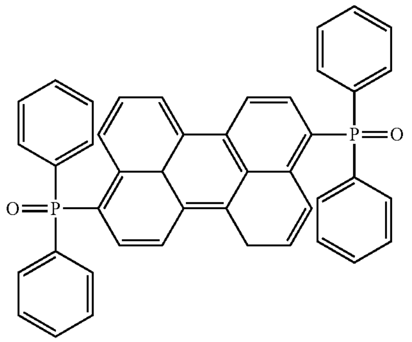

dpper

Synthesis of 3,9-Dibromoperylene

NBS (2.82 mg, 15.8 mmol) was dissolved in super dehydrated THF (90 ml) to obtain an NBS solution. Perylene (500 mg, 2.0 mmol) was added to super dehydrated THF (30 ml) and dispersed. The NBS solution (90 ml) was added dropwise to the obtained dispersion liquid, and the dispersion liquid was refluxed for 18 hours at 70° C. to react perylene with NBS. After completing the reaction, powder was obtained by reprecipitation from a mixed solvent of THF and $H_2O$. The obtained powder was washed with hexane and dried to obtain a solid of the product (3,9-dibromoperylene) (yield constant 59%, yield 480 mg).

$^1H$ NMR (400 MHz, $CDCl_3$) δ/ppm=7.56-7.61 (m, 2H), 7.76 (dd, 11.2 Hz, 2H), 7.98 (dd, 2H), 8.10 (d, 2H), 8.22 (dd, 2H)

Synthesis of dpper

A solid of dpper was obtained (yield constant 7%, yield 32 mg) by the same method as in the synthesis of pdpo, except that 3,9-dibromoperylene was used.

$^1H$ NMR (400 MHz, $CDCl_3$) δ/ppm=7.47-7.51 (m, 11H), 7.58 (t, 4H), 7.72 (dd, 9H), 8.09 (t, 2H), 8.25 (t, 2H), 8.52 (d, 1H), 8.59 (d, 1H) ESI-MS: m/z calcd for $C_{44}H_{31}O_2P_2$ $[M+H^+]$=653.17; found: 653.18.

2. Synthesis of Lu Complex

Synthesis Example 3: $Lu(hfa)_3(pdpo)_2$

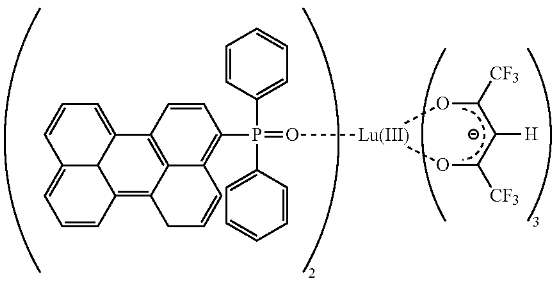

$Lu(hfa)_3(pdpo)_2$

Synthesis of $Lu(hfa)_3(H_2O)_2$

Lutetium acetate tetrahydrate (2.0 g, 4.7 mol) was dissolved in $H_2O$ (30 ml). Hexafluoroacetylacetone (hfa) (2.9 g, 14 mmol) was added dropwise to the obtained solution. The pH of the solution was adjusted to 7 with 30% ammonia water, and the solution was stirred for 3 hours at room temperature. The precipitated product was taken out by suction filtration and washed with chloroform, and powder of the product ($Lu(hfa)_3(H_2O)_2$) was recovered (yield constant 74%, yield 2.9 g).

Synthesis of $Lu(hfa)_3(pdpo)_2$ pdpo (90 mg, 0.2 mmol) was dissolved in dichloromethane (60 ml). $Lu(hfa)_3(H_2O)_2$ (124 mg, 0.15 mmol) was added to the obtained solution, and the solution was stirred at room temperature for 6 hours. Thereafter, the precipitated product was taken out by filtration, and crystals of the product were obtained (yield constant 83%, yield 140 mg) by recrystallization from a mixed solvent of dichloromethane/hexane=1:4.

ESI-MS: m/z calcd for $C_{74}H_{44}F_{12}LuO_6P_2[M-hfa]^+$= 1493.18. found: 1493.26.

Synthesis Example 4: $Lu_2(hfa)_6(dpper)_2$

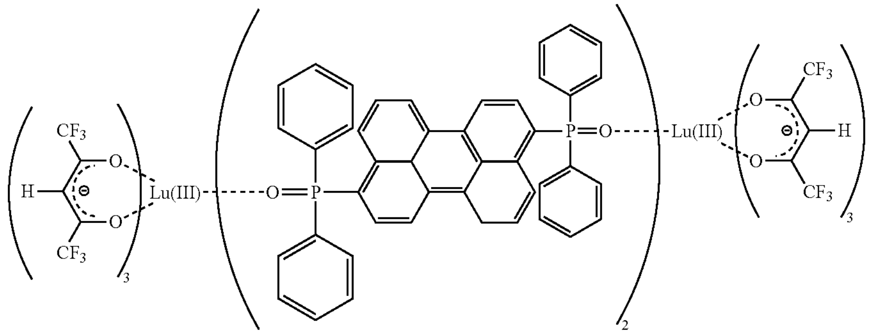

$Lu_2(hfa)_6(dpper)_2$ $Lu_2(hfa)_6(dpper)_2$ was synthesized (yield constant 72%, yield 51 mg) by the same method as in the synthesis of $Lu(hfa)_3(pdpo)_2$, except that dpper was used instead of pdpo.

ESI-MS: m/z calcd for $C_{113}H_{65}F_{30}Lu_2O_{14}P_4[M\text{-}hfa]^+$= 2689.17. found: 2689.29.

3. Evaluation

3-1. Photoabsorption Spectrum

The photoabsorption spectra of pdpo, dpper, $Lu(hfa)_3(pdpo)_2$, and $Lu_2(hfa)_6(dpper)_2$ in a dichloromethane solution were measured. FIG. 1 shows the photoabsorption spectra of pdpo, dpper, $Lu(hfa)_3(pdpo)_2$, and $Lu_2(hfa)_6(dpper)_2$. In the absorption spectrum of $Lu(hfa)_3(pdpo)_2$, in addition to the same absorption band as that of pdpo, a new absorption band near 300 nm, which is considered to be derived from hexafluoroacetone (hfa), was observed. In the photoabsorption spectrum of $Lu_2(hfa)_6(dpper)_2$, the absorption band near 460 nm derived from dpper in the longest wavelength region was shifted to the long wavelength side as compared to the absorption band of the dpper simple substance, and this suggests that both dppers interact with each other in the complex.

3-2. Emission Spectrum

Figure 2:
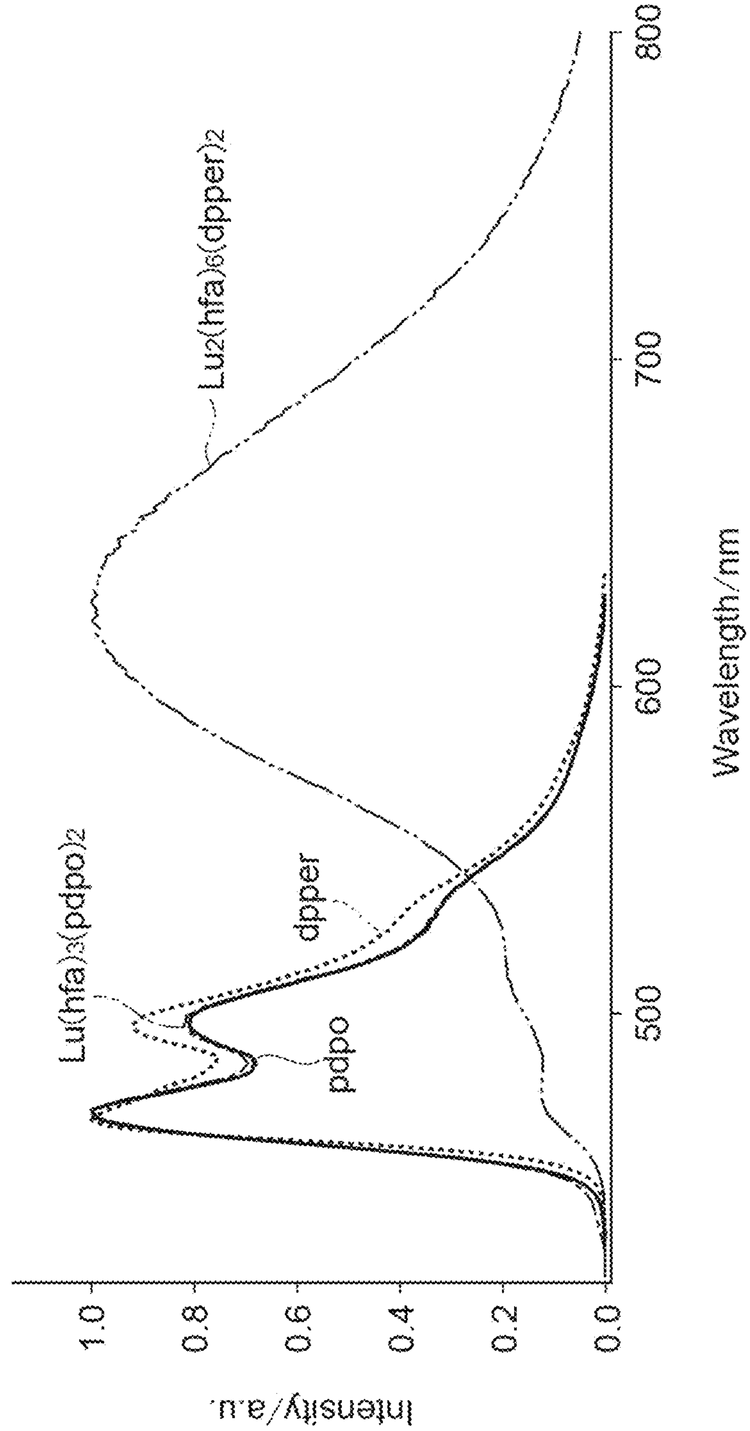
FIG. 2 shows emission spectra of the ligand and the lutetium complex.

The emission spectra of pdpo, dpper, $Lu(hfa)_3(pdpo)_2$, and $Lu_2(hfa)_6(dpper)_2$ in a solution were measured at an excitation light of 400 nm and a fluorescence wavelength of 420 to 800 nm. As the solvent, dichloromethane was used in the case of pdpo and dpper, and toluene was used in the case of $Lu(hfa)_3(pdpo)_2$ and $Lu_2(hfa)_6(dpper)_2$. FIG. 2 shows the emission spectra of pdpo, dpper, $Lu(hfa)_3(pdpo)_2$, and $Lu_2(hfa)_6(dpper)_2$ in a solution. In the emission spectrum of pdpo, the emission peak was observed at 471 nm and 497 nm, and these peaks are considered to correspond to transition of 0→0 and transition of 0→1, respectively. In the emission spectrum of dpper, a larger emission peak than that in pdpo was observed at 468 nm and 497 nm. The solution of $Lu(hfa)_3(pdpo)_2$ emitted intensive blue light, and the emission spectrum thereof was almost the same as the emission spectrum of pdpo. This suggests that the interaction between pdpo coordinated with the rare earth ion and another ligand is small. In the emission spectrum of $Lu_2(hfa)_6(dpper)_2$, a broad emission band was newly observed at the long wavelength side. The absorption band shift from dpper to $Lu_2(hfa)_6(dpper)_2$ was 900 $cm^{-1}$; on the other hand, the emission band shift was 5000 $cm^{-1}$. This suggests that the integrated structure of dpper existing around the rare earth ion greatly changes due to light excitation.

3-3. Emission Lifetime and Emission Quantum Yield

Table 1 shows measurement results of an emission lifetime τ and an emission quantum yield Φ of $Lu(hfa)_3(pdpo)_2$ and $Lu_2(hfa)_6(dpper)_2$ and $k_r$ and $k_{nr}$ calculated therefrom. The emission lifetime τ and the emission quantum yield Φ were measured at each excitation light of 390 nm and 420 nm in a toluene solution at 25° C.

TABLE 1

| | Solvent | τ [ns][a] | Φ [%] | $k_r$ [$s^{-1}$] | $K_{nr}$ [$s^{-1}$] |
|---|---|---|---|---|---|
| $Lu(hfa)_3(pdpo)_2$ | Toluene | 4.2 | 46 | $1.1 \times 10^8$ | $1.3 \times 10^8$ |
| $Lu_2(hfa)_6(dpper)_2$ | Toluene | 44 | 18 | $4.1 \times 10^6$ | $1.9 \times 10^7$ |

3-4. Light Emission in Solid

When about 10 mg of crystals of $Lu_2(hfa)_6(dpper)_2$ was irradiated with an excitation light of 365 nm, intensive light emission was confirmed. On the other hand, in the case of irradiating the solid of dpper with excitation light, light emission was not confirmed.

Figure 3:
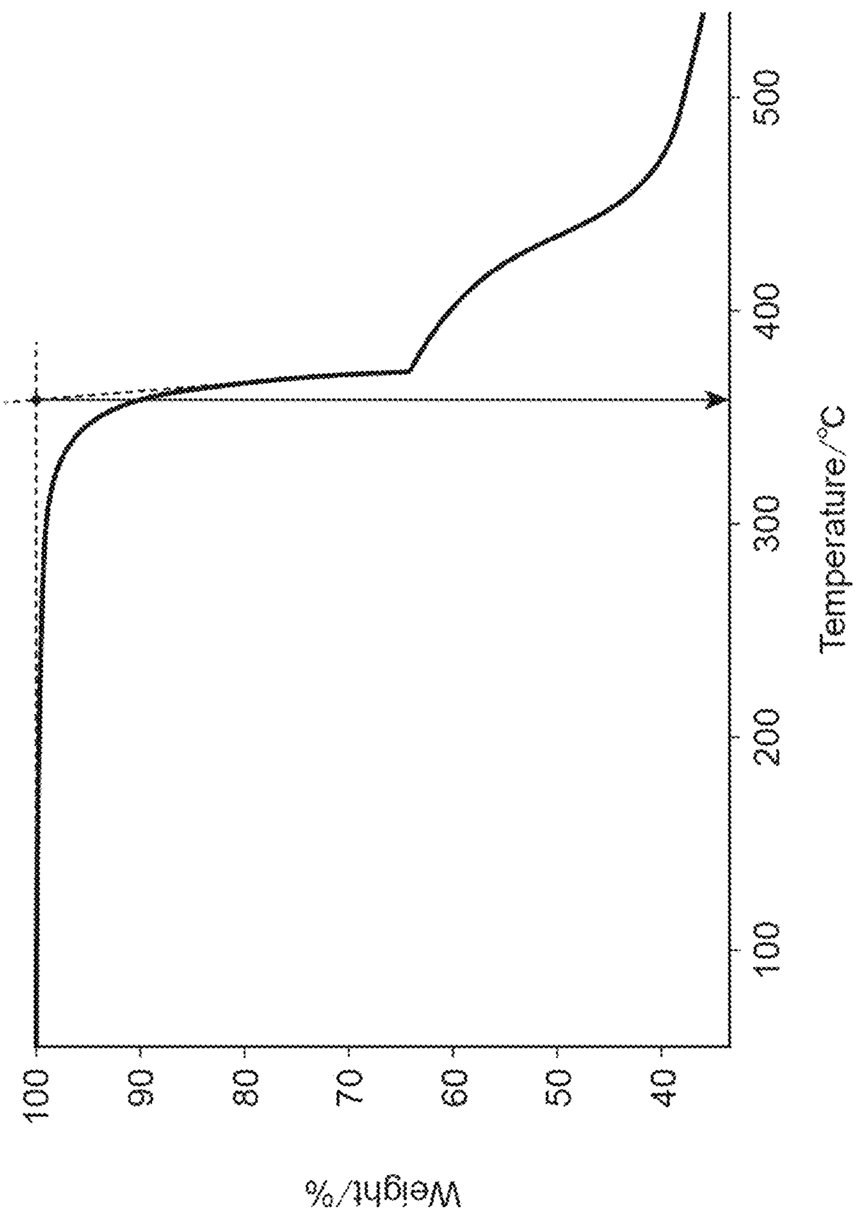
FIG. 3 is a graph showing a result of thermogravimetric analysis of the lutetium complex.

3-5. Thermogravimetric Analysis $Lu_2(hfa)_6(dpper)_2$ was evaluated by thermogravimetric analysis. FIG. 3 shows a measurement result of thermogravimetric analysis. The pyrolysis temperature was 360° C., and it was confirmed that $Lu_2(hfa)_6(dpper)_2$ had very high heat resistance.

3-6. Temperature-Sensitive Luminescence Properties

Figure 4:
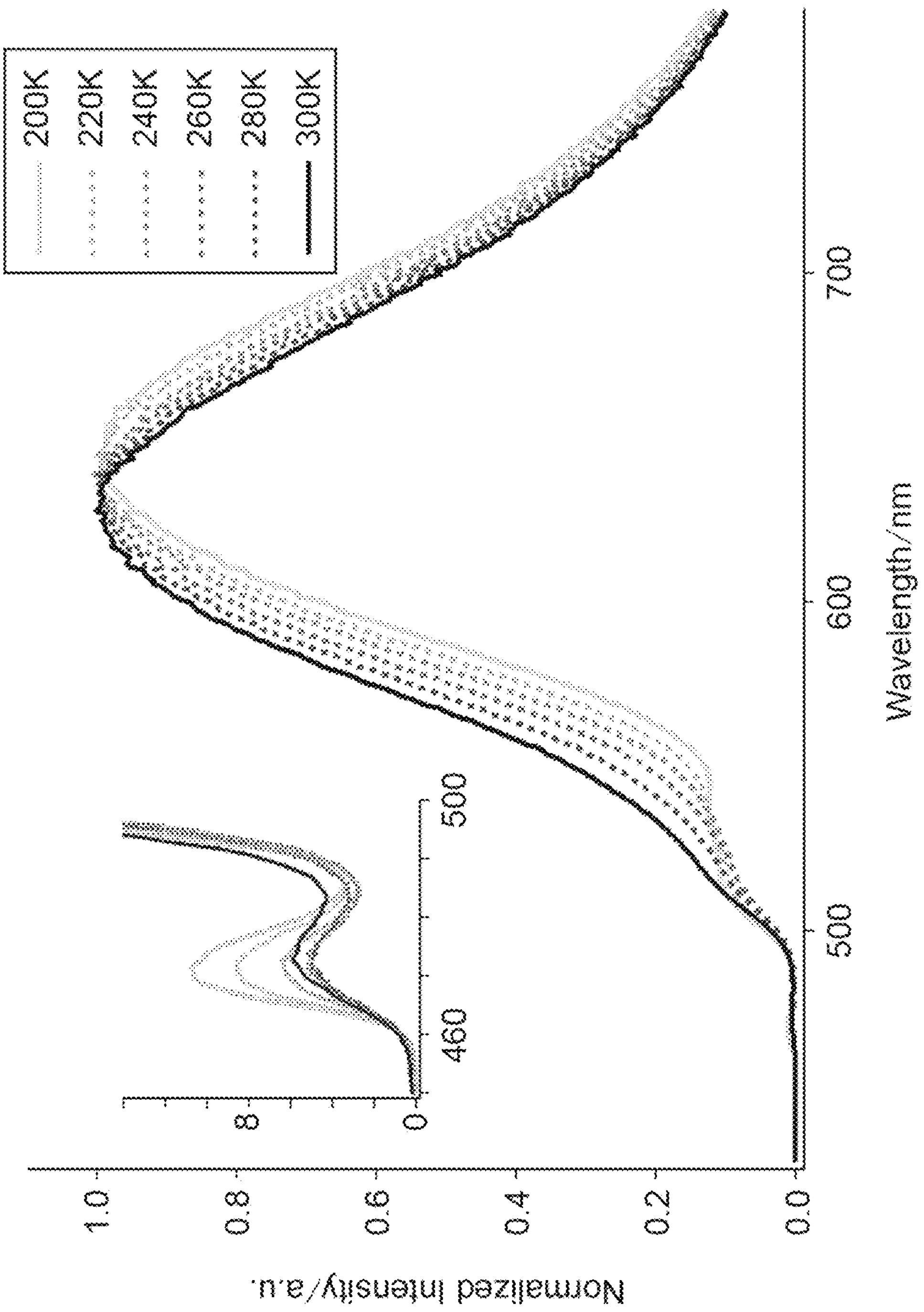
FIG. 4 shows an emission spectrum of the lutetium complex at 200 to 300 K.

The emission spectrum of $Lu_2(hfa)_6(dpper)_2$ in a dichloromethane solution was measured at an excitation light of 400 nm and a fluorescence wavelength of 420 to 780 nm while changing a temperature from 200 K to 300 K. FIG. 4 shows the emission spectrum of $Lu_2(hfa)_6(dpper)_2$ at 200 K to 300 K. It was confirmed that the luminescence properties of $Lu_2(hfa)_6(dpper)_2$ varied depending on temperatures.

4. Synthesis of Rare Earth Complex Having Repeating Structure and Evaluation thereof

4-1. Synthesis of Ligand

Synthesis Example 5: Bidentate Ligand bpDPA ((9,10-Diphenylanthracene-2,6-Diyl)Bis(Diphenylphosphine Oxide))

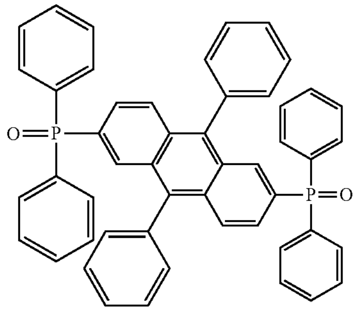

bpDPA 2,6-Dibromo-9,10-diphenylanthracene (500 mg, 1.02 mmol), potassium acetate (333 mg, 1.8 mmol), and palladium(II) acetate (about 3 mg) were added to dehydrated dimethyl acetamide (15 ml) and dissolved in dimethyl acetamide by heating at 100° C. to prepare a reaction solution. When diphenylphosphine (0.5 ml, 2.04 mmol) was added dropwise to this reaction solution, and the reaction solution was refluxed for 24 hours at 100° C., precipitate was produced in the reaction solution. The reaction solution was air-cooled, then $H_2O$ (120 ml) was added thereto, and precipitate was recovered. The obtained precipitate was dispersed in dichloromethane (100 ml), a 30% hydrogen peroxide solution (2 ml) was added thereto, and the dispersion liquid was stirred at 0° C. for 5 hours. Thereafter, the product was extracted with dichloroethane and saturated saline. The solvent was distilled from the dichloroethane layer, and the obtained powder was recrystallized in a mixed solvent of dichloromethane and methanol to obtain yellow crystals of dpDPA (yield 210 mg, yield constant 28%).

$^1H$ NMR (400 MHz, $CDCl_3$) δ/ppm=7.29-7.61 (m, 32H), 7.79 (d, 11.6 Hz, 2H), 7.91 (d, 16.0 Hz, 2H)

ESI-MS: m/z calcd for $C_{50}H_{37}O_2P_2$[M+H]+=731.22. found: 731.23.

Elemental analysis (%): $C_{50}H_{36}O_2P_2$ calcd for C, 82.18, H, 4.97. found: C, 82.40, H, 4.76.

4-2. Synthesis of Lu Complex

Synthesis Example 6: $[Lu(hfa)_3(bpDPA)]_n$

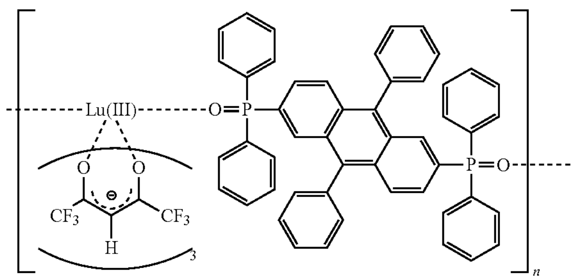

$[Lu(hfa)_3bpDPA]_n$ bpDPA (5 mg, 0.01 mmol) was dissolved in dichloromethane (0.5 ml). $Lu(hfa)_3(H_2O)_2$ (7 mg, 0.01 mmol) was dissolved in methanol (0.5 ml). The solution of bpDPA was put in a micro tube, and the solution of $Lu(hfa)_3(H_2O)_3$ was slowly stacked on the solution of bpDPA. When the micro tube was covered with a lid and left to stand still at room temperature, needle-shaped crystals of $[Lu(hfa)_3(bpDPA)]_n$ were precipitated on the wall surface of the micro tube.

Elemental analysis (%): $C_{65}H_{39}F_{18}O_8P_2Lu$ calcd for C, 51.13, H, 2.57. found: C, 50.82, H, 2.44.

FT-IR (ATR)=1655(st, C═O), 1249(st, C—F), 1169(st, P═O) $cm^{-1}$

Figure 5:
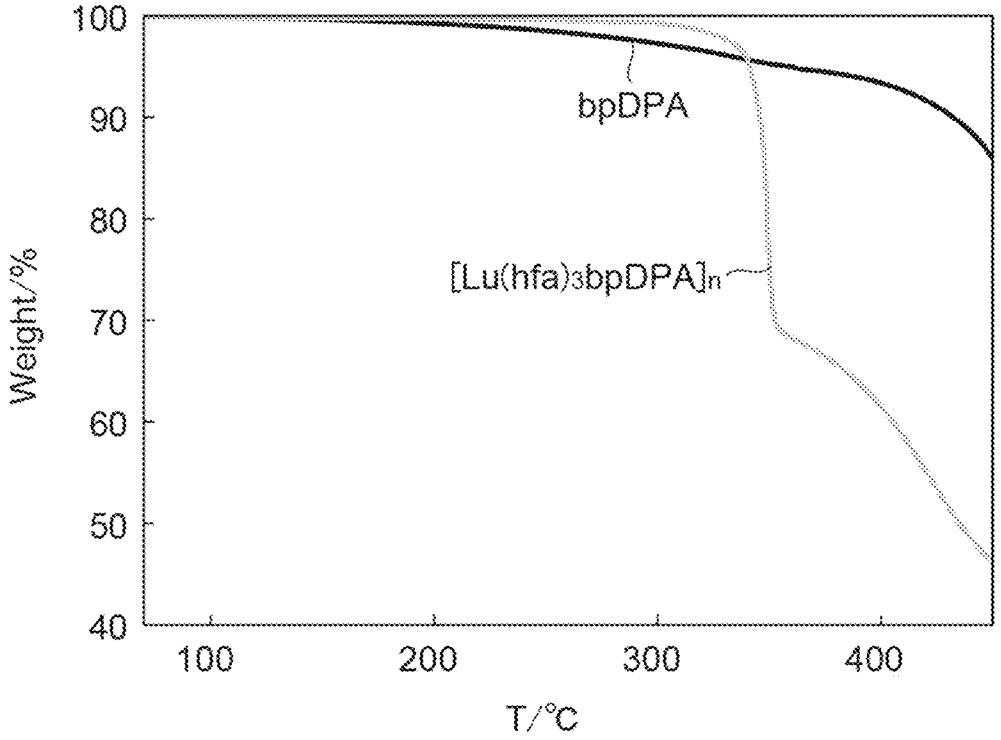
FIG. 5 is a graph showing a result of thermogravimetric analysis of the ligand and the lutetium complex.

4-3. Evaluation bpDPA and $[Lu(hfa)_3(bpDPA)]_n$ were evaluated by thermogravimetric analysis. FIG. 5 shows a measurement result of thermogravimetric analysis. $Lu_2(hfa)_6(dpper)_2$ showed a pyrolysis temperature exceeding 340° C. and had high heat resistance.

Figure 6:
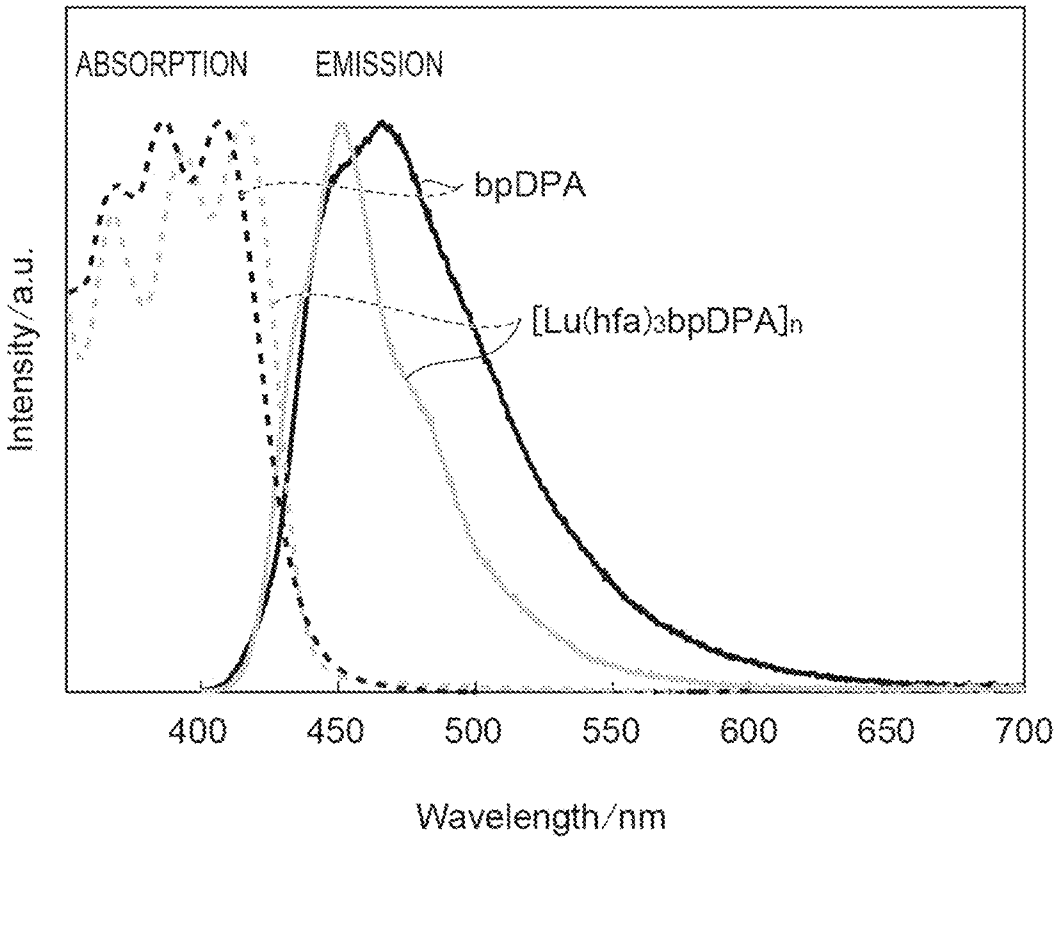
FIG. 6 shows photoabsorption and emission spectra of the ligand and the lutetium complex.

The photoabsorption and emission spectra of bpDPA and $[Lu(hfa)_3(bpDPA)]_n$ were measured using samples diluted 3000 times with KBr. FIG. 6 shows the photoabsorption and emission spectra of bpDPA and $[Lu(hfa)_3(bpDPA)]_n$. It was confirmed that $[Lu(hfa)_3(bpDPA)]_n$ exhibited improved chromatic purity as compared to bpPDA.

Table 2 shows measurement results of the emission lifetime τ and the emission quantum yield Φ of bpDPA and $[Lu(hfa)_3(bpDPA)]_n$ and $k_r$ and $k^{nr}$ calculated therefrom. The emission quantum yield Φ was measured by an excitation light of 380 nm in an argon atmosphere. Table 2 also shows a full width at half maximum (FWHM) of the peak band in the emission spectrum. It was confirmed that $[Lu(hfa)_3(bpDPA)]_n$ exhibited improved luminance efficiency as compared to bpPDA.

TABLE 2

| | FWHM [nm] | τ [ns] | Φ [%] | $k_r$ [$s^{-1}$] | $K_{nr}$ [$s^{-1}$] |
|---|---|---|---|---|---|
| bpPDA | 77 | 4.5 | 18 | $4.0 \times 10^7$ | $1.8 \times 10^8$ |
| $[Lu(hfa)_3bpDPA)]_n$ | 50 | 3.6 | 25 | $6.9 \times 10^7$ | $2.1 \times 10^8$ |

The invention claimed is:

1. A rare earth complex comprising:

one or a plurality of rare earth ions; and a ligand forming a coordinate bond with the rare earth ions, wherein at least a part of the rare earth ions are at least one selected from the group consisting of lutetium (III) ions, yttrium (III) ions, and gadolinium (III) ions, and the ligand comprises a residue obtained by removing one or more hydrogen atoms from a fluorescent condensed polycyclic aromatic compound, wherein the condensed polycyclic aromatic compound is a compound represented by the following formula (1):

(1)

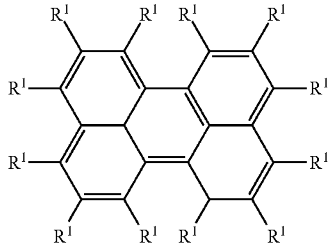

$R^1$ represents a hydrogen atom, a halogen atom, a cyano group, an amino group that may have a substituent, or an aryl group that may have a substituent, and a plurality of $R^1$s in the same molecule may be the same as or different from each other.

2. A rare earth complex comprising:

one or a plurality of rare earth ions; and a ligand forming a coordinate bond with the rare earth ions, wherein at least a part of the rare earth ions are at least one selected from the group consisting of lutetium (III) ions, yttrium (III) ions, and gadolinium (III) ions, and the ligand comprises a residue obtained by removing one or more hydrogen atoms from a fluorescent condensed polycyclic aromatic compound, wherein the condensed polycyclic aromatic compound is a compound represented by the following formula (1), (2) or (1-3):

(1)

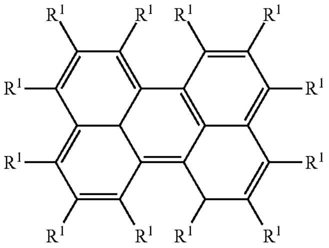

(2)

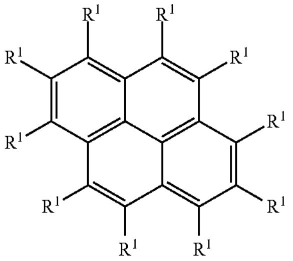

(1-3)

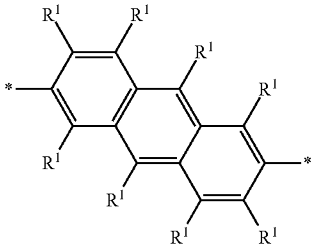

$R^1$ represents a hydrogen atom, a halogen atom, a cyano group, an amino group that may have a substituent, or an aryl group that may have a substituent, and a plurality of $R^1$s in the same molecule may be the same as or different from each other, and wherein the rare earth complex has a plurality of the rare earth ions and a plurality of the ligands that are bidentate and comprise the residue obtained by removing one or more hydrogen atoms from the condensed polycyclic aromatic compound, a repeating structure is formed by alternately arranging the rare earth ions and the bidentate ligands, and the ligands that are bidentate include a bidentate phosphine oxide ligand represented by the following formula (21) or (22):

(21)

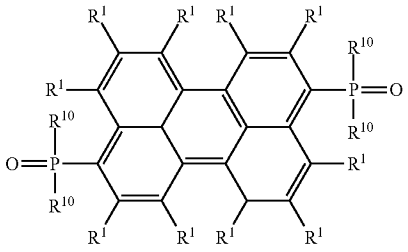

(22)

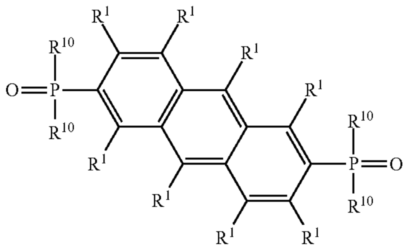

$R^1$ represents a hydrogen atom, a halogen atom, a cyano group, an amino group that may have a substituent, or an aryl group that may have a substituent, and a plurality of $R^1$s in the same molecule may be the same as or different from each other, $R^{10}$ represents an aryl group which may have a substituent.

3. The rare earth complex according to claim 1, wherein the ligand is a phosphine oxide ligand comprising a residue obtained by removing one or more hydrogen atoms from the condensed polycyclic aromatic compound and a phosphine oxide group bonded to the residue.

4. A luminescent body comprising the rare earth complex according to claim 1.

* * * * *